United States Patent [19]

Hatfield

[11] Patent Number: 4,867,105

[45] Date of Patent: Sep. 19, 1989

[54] SAFETY STANCHION RELEASE APPARATUS

[76] Inventor: John Hatfield, 1823 Shoestring Rd., Gooding, Id. 83330

[21] Appl. No.: 230,498

[22] Filed: Aug. 10, 1988

[51] Int. Cl.$^4$ .............................................. A01K 1/00
[52] U.S. Cl. ................................................... 119/148
[58] Field of Search ............... 119/147 R, 147 A, 148, 119/149, 99, 98

[56] References Cited

U.S. PATENT DOCUMENTS

| | | | |
|---|---|---|---|
| Re. 32,728 | 8/1988 | Albers, Sr. ........................ | 119/148 |
| 4,055,149 | 10/1977 | Haiges ............................... | 119/147 |
| 4,185,592 | 1/1980 | Albers, Sr. ........................ | 119/148 |
| 4,377,131 | 3/1983 | Vandenberg et al. ............. | 119/148 |
| 4,457,265 | 7/1984 | Anderson .......................... | 119/148 |
| 4,476,815 | 10/1984 | Albers, Sr. ..................... | 119/148 X |
| 4,495,897 | 1/1985 | Albers, Sr. ........................ | 119/148 |

FOREIGN PATENT DOCUMENTS

| | | | |
|---|---|---|---|
| 2446026 | 4/1976 | Fed. Rep. of Germany ...... | 119/148 |
| 2632057 | 1/1978 | Fed. Rep. of Germany ...... | 119/148 |
| 2818513 | 11/1979 | Fed. Rep. of Germany ... | 119/147 R |
| 7333333 | 5/1975 | France .............................. | 119/148 |
| 7536310 | 7/1977 | France .............................. | 119/148 |
| 646960 | 2/1979 | U.S.S.R. ....................... | 119/147 R |

Primary Examiner—Gene Mancene
Assistant Examiner—R. Thomas Price
Attorney, Agent, or Firm—Frank J. Dykas; Craig M. Korfanta

[57] ABSTRACT

A safety release apparatus 10 for use with a cattle stanchion apparatus 11 which includes a top cover plate 30 having side plates 27 depending perpendicularly therefrom and attached to top end of release stanchion 17 and further enclosing top rail 12 and stanchion actuator 20. Stop dog 24 and catch tang 25 are pivotally attached to side walls 27 via dog and tang bolt 26 and engage couplers 21 which are radially attached to stanchion actuator 20. Stop dog 24 has a pair of grab walls 32 depending perpendicularly therefrom to facilitate the disengaging of stop dog 24 with coupler 21 by the cattle stanchion operator. Cover plate 30 in connection with side plates 27 present a safe grab hold for the hand of the stanchion operator while disengaging stop dog 24, or catch tang 25, with coupler 21.

1 Claim, 4 Drawing Sheets

4,867,105

SAFETY STANCHION RELEASE APPARATUS

BACKGROUND OF THE INVENTION

1. Technical Field

The present invention relates to a cattle stanchion apparatus and more particularly to a safety release apparatus for both single and double release cattle stanchions.

2. Background Art

The current state of the art in cattle stanchions is best exemplified by ALBERS, SR., U.S. Pat. Nos. 4,476,815, and 4,495,897. The first ALBERS patent '815 teaches a single release cattle stanchion while '897 teaches a double release cattle stanchion. Both the single and double release stanchions are controlled by a rotatable and axially movable positioner or actuator rod which has a series of couplers protruding radially outward from its surface for engaging the latches located on the top end of the individual release stanchions.

Because the latches of both the single and double release stanchions of ALBERS are exposed on their top side, they present a serious health hazard to the operator. During the course of veterinary examinations and animal lock-up, there are instances wherein an individual cow must be released from the stanchion without releasing any of the other cattle. The operator must somehow flip the latch up over the coupler allowing the release stanchion to fall to an open position. Very strong pressures can be exerted on the release stanchion by the cow which makes releasing the stanchion a precarious and dangerous operation. In fact, most operators opt to use a metal rod of some sort to flip the latch over the coupler. The problem is that there is no safe place to grab the release stanchion to counteract the pressure exerted by cow and subsequently flip the latch over the coupler.

The double release stanchion presents an additional problem of the cows being able to bounce the stop latch over the coupler allowing the release stanchion to pivot into the down cattle position and the cow can thereby free itself. This can be very dangerous for the cattlemen when trying to attend to the cow during pregnancy testing, vaccination, animal tagging, etc. The double release stanchion apparatus represents a great improvement over the single release stanchion in that a provision is made for freeing a downed animal, however, it also presents an additional hazard in that the stop latch must be flipped up and over the coupler to allow the release stanchion to pivot into the open downed animal position. Again, most operators opt to use some sort of metal rod rather than getting their hands close to the stanchion release latches.

What is needed is a release apparatus which provides a safe handhold for the operator, thereby allowing the operator to grab ahold of the release stanchion in order to counteract the forces exerted by the cow and flip the latch up over the coupler in order to release the stanchion. A second need is an improved latch for the double release stanchion which cuts down the possibility of a cow freeing itself by bouncing the stop latch over the coupler and releasing the stanchion into the open downed animal position.

DISCLOSURE OF INVENTION

These objects are accomplished by a safety release apparatus which includes a top cover plate having sides depending perpendicularly therefrom and encloses the actuator bar and thereby provides a safe handhold for the operator. Additionally, in the case of the double release stanchion, a stop latch, also called a stop dog, is provided which has a length substantially less than that of the catch latch, also called catch tang, which results in the stop diog being disposed at a substantially steeper incline tending to prohibit the cow from bouncing the stop dog over the coupler. The stop dog is constructed from a generally rectangular top plate having two grab walls depending perpendicularly from each of its long edges, which facilitate gripping by the fingers of the operator.

BEST MODE FOR CARRYING OUT INVENTION

Figure 1:
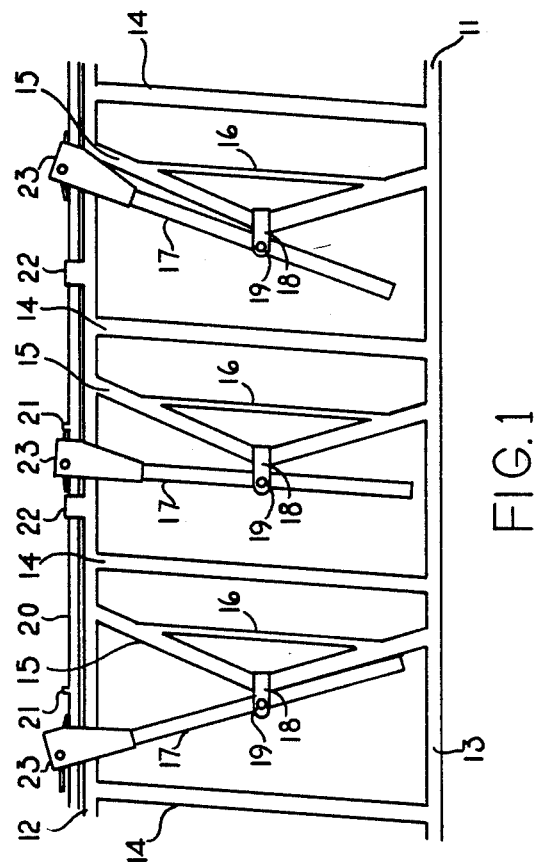
FIG. 1 is a side view of double release cattle stanchion.

Referring now to FIG. 1, a double release cattle stanchion apparatus 11 is shown and includes a main frame constructed from top rail 12, bottom rail 13 and slanted fixed stanchions 14. A slanted knee bar 15 is also provided and has a knee bar support 16 welded across the knee vertex. A straight release stanchion 17 is pivotally attached to slanted knee bar 15 at the knee bar vertex by bracket 18 and stanchion pivot bolt 19. Release stanchion actuator 20 is disposed parallel to top rail 12 and is slidably and axially movable thereon via actuator supports 22. A plurality of couplers 21 are radially attached to stanchion actuator 20 for engagement with a coupler engagement means located on the release stanchions 17. Couplers 21 are disposed on stanchion actuator 20 such that axial rotation of actuator 20 provides for different modes of operation i.e. automatic lock, manual lock, or no lock modes.

Figure 2:
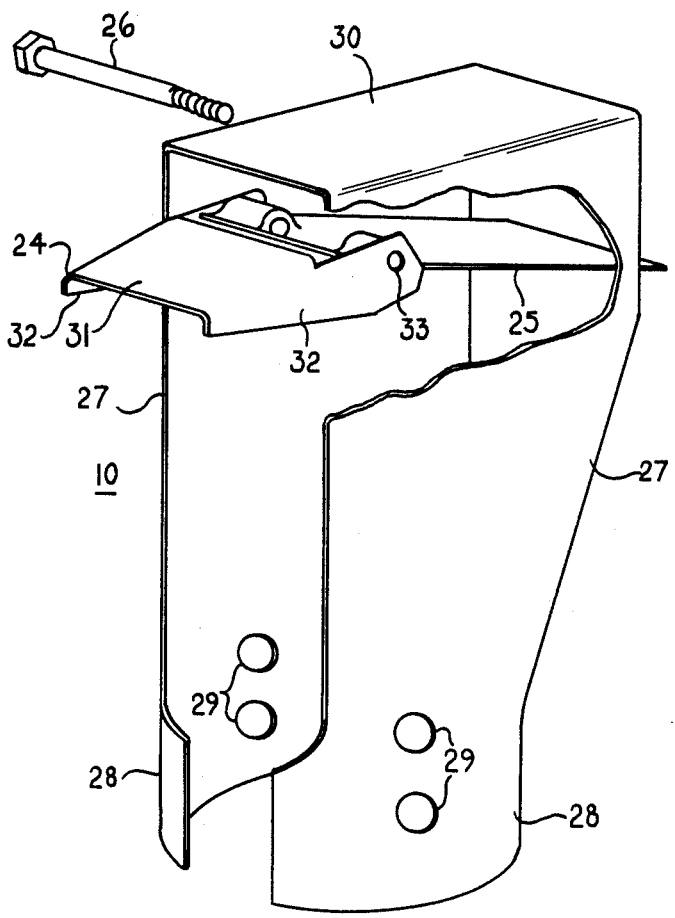
FIG. 2 is a three quarter perspective partial cut away of a new improved safety release apparatus.

Referring now to FIG. 2 a safety release apparatus 10 is shown and has stop dog 24 and catch tang 25 pivotally attached thereto via pivot bolt 26 and a suitable nut not shown. Safety release apparatus 10 has an outer housing constructed from a top cover plate 30 having side plates 27 depending perpendicularly therefrom. Curved segments 28 are located at the bottom ends of side plates 27 and have release stanchion attachment holes 29 therein for attachment to release stanchion 17 of FIG. 1.

Figure 3:
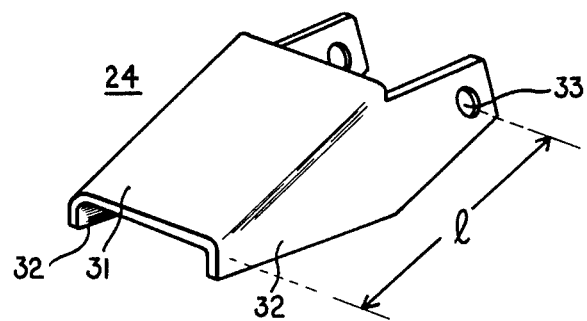
FIG. 3 is a three quarter perspective view of a stop dog.
Figure 4:
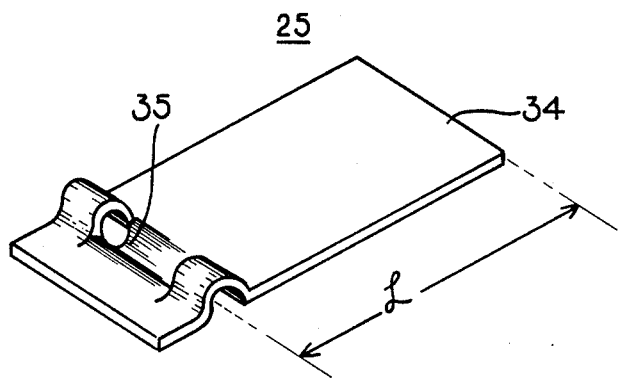
FIG. 4 is a three quarter perspective view of a catch tang.

Referring also now to FIGS. 3 and 4, stop dog 24 is shown and is constructed from dog plate 31 having grab walls 32 which depend perpendicularly therefrom and each have an extended portion having dog and tang bolt hole 33 therein. Catch tang 25 is shown and is constructed from tang plate 34 and has a pressed pivot bolt receiving channel 35 therein for receiving the dog and tang bolt 26.

Referring specifically now to FIGS. 3 and 4 the relative lengths of stop dog 24 and catch tang 25 are illustrated. FIG. 3 shows stop dog 24 having an effective length l while FIG. 4 shows catch tang 25 having an effective length L wherein L represents a length longer than that of l. The shorter length of stop dog 24 provides for a steeper incline of stop dog 24 when engaged with coupler 21 making it much more difficult for a cow to bounce stop dog 24 free of coupler 21 thereby allowing the release stanchion 17 to fall into an open downed animal position.

Figure 5:
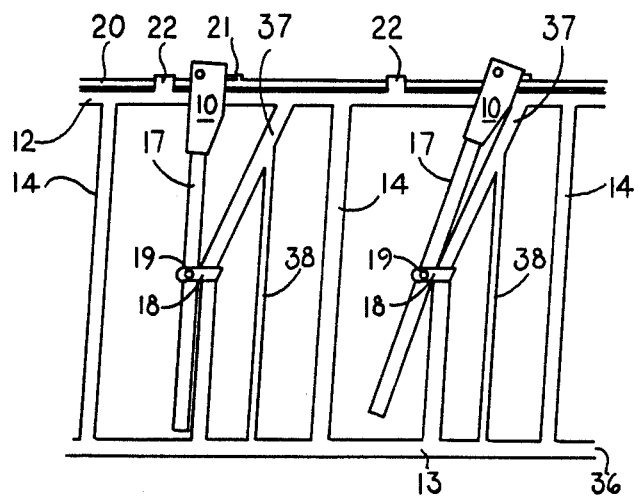
FIG. 5 is a side view of a single release cattle stanchion apparatus.

FIG. 5 shows a single release cattle stanchion 36 which is substantially the same as the double release cattle stanchion 11 of FIG. 1 with the exception that slanted knee bar 15 of FIG. 1 is replaced by a second slanted knee bar 37 and likewise knee bar support 16 replaced by second knee bar support 38. The difference being that the bottom portion of second slanted knee bar 37 is disposed along bottom rail 13 such that release stanchion 17 butts against it when in the closed position and prohibits release stanchio 17 from falling into the open downed animal position. Stop dog 24 is eliminated from this particular embodiment of safety release apparatus 10 in that it is no longer necessary.

While there is shown and described the present preferred embodiment of the invention, it is to be distinctly understood that this invention is not limited thereto but may be variously embodied to practice within the scope of the following claims.

I claim:

1. In a double release cattle stanchion apparatus, having fixed stanchion and release stanchion pairs defining openings for the heads of cattle, each stanchion pair having an open position, a closed position and a downed animal position, said cattle stanchion apparatus also having a release stanchion actuator bar having couplers thereon for engaging a top end of said release stanchions and positioning them in either a closed position or an open position, a safety release apparatus, wherein the improvement comprises:

a top cover plate having an opposing pair of side walls depending perpendicularly therefrom, enclosing said actuator bar and connected to a release stanchion for providing safe handhold for the operator;

a rectangular catch tang having a pivot bolt receiving channel disposed along the width of said catch tang for receiving a pivot bolt therethrough;

a stop dog including a dog plate having two grab walls depending perpendicularly therefrom each having a pivot bolt receiving hole therethrough, said grab walls providing a safe grabhold for the fingers of an operator for releasing said release stanchion to its downed animal position, said dog plate being generally rectangular and having a length less than that of said catch tang such that said stop dog is disposed at a substantially steeper incline than that of said catch tang when engaged with said release stanchion actuator;

a pivot bolt for pivotally attaching said stop dog and catch tang to said side walls and holding said stop dog and catch tang in slidable engagement with said actuator and for positive engagement of said couplers.

* * * * *